United States Patent
Okano et al.

[11] Patent Number: 5,949,945
[45] Date of Patent: Sep. 7, 1999

[54] OPTICAL WAVEGUIDE, OPTICAL MODULE AND OPTICAL SYSTEM USING THE SAME

[75] Inventors: Hiroaki Okano; Yasuharu Mutoh; Toshikazu Kamoshida, all of Ibaraki-ken, Japan

[73] Assignee: Hitachi Cable, Ltd., Tokyo, Japan

[21] Appl. No.: 08/703,630

[22] Filed: Aug. 29, 1996

[30] Foreign Application Priority Data

Feb. 27, 1996 [JP] Japan .................................. 8-039366

[51] Int. Cl.⁶ .................................................. G02B 6/10
[52] U.S. Cl. ............................ 385/132; 385/129; 65/386
[58] Field of Search .................... 385/129–132, 385/123–128; 65/385, 386

[56] References Cited

U.S. PATENT DOCUMENTS

| | | | |
|---|---|---|---|
| 3,791,714 | 2/1974 | Maurer | 385/142 |
| 4,235,615 | 11/1980 | Rau et al. | 385/142 |
| 4,733,939 | 3/1988 | Utsumi et al. | 385/141 |
| 4,747,663 | 5/1988 | Huber | 385/127 |
| 4,765,702 | 8/1988 | Dohan et al. | 385/129 |
| 5,315,685 | 5/1994 | Fabian et al. | 385/142 |
| 5,349,456 | 9/1994 | Iwanaga et al. | 359/82 |
| 5,364,433 | 11/1994 | Nishimura et al. | 65/17.4 |
| 5,543,613 | 8/1996 | Bruce et al. | 385/129 |

FOREIGN PATENT DOCUMENTS

| | | |
|---|---|---|
| 0 608 566 | 8/1994 | European Pat. Off. . |
| 5-97466 | 4/1993 | Japan . |
| 05288944 | 11/1993 | Japan . |
| 5-301733 | 11/1993 | Japan . |
| 6-11705 | 1/1994 | Japan . |
| 6-67198 | 3/1994 | Japan . |

*Primary Examiner*—Hemang Sanghavi
*Attorney, Agent, or Firm*—McDermott, Will & Emery

[57] ABSTRACT

An optical waveguide comprises an anhydrous synthetic silica glass substrate 1, which contains less than a predetermined concentration of hydroxyl group, a core waveguide 2 having a rectangular cross-section being formed on the substrate 1, and a cladding layer 3 having a lower refractive index thereof than the core waveguide 2 being covered by the cladding layer 3. The concentration of hydroxyl group contained in a synthetic silica glass substrate of an optical waveguide or an optical device is essentially less than 300 ppm, preferably less than 100 ppm, more preferably less than 50 ppm.

13 Claims, 5 Drawing Sheets

OPTICAL WAVEGUIDE, OPTICAL MODULE AND OPTICAL SYSTEM USING THE SAME

BACKGROUND OF THE INVENTION

This invention relates to an optical waveguide, an optical module, and an optical system using the same, and more particularly to, an optical waveguide, an optical module, and an optical system using the same which are suitable for optical circuit devices, such as optical star couplers, optical multiplexers/demultiplexers, optical switches, optical modulators, wavelength-independent optical couplers, etc., and optical transmission systems.

At present, many optical systems, such as an optical subscriber's system, an optical CATV, an optical submarine cable transmission system and an optical information processing system, have been actively developed. For the configuration of such optical systems, optical circuit devices, such as optical star couplers, optical multiplexers/demultiplexers, optical switches, optical modulators, wavelength-independent optical couplers, and optical transmission modules, in which such optical circuit devices such as a semiconductor laser and/or a photodiode, etc. are incorporated, are essential devices. An optical fiber-type device and an optical waveguide-type device are known to be used for such optical circuit devices. The optical waveguide-type device is expected to achieve a small size, low-cost and productive device because it also has the functions of the optical fiber-type device.

An optical waveguide using a semiconductor substrate like silicon and an optical waveguide using a silica glass substrate are already known. However, the optical waveguide using the silica glass substrate is more advantageous because it can be connected to an optical fiber by a fusing technique and less polarization-dependent loss is obtained.

A conventional optical waveguide comprises a silica glass substrate, at least one core waveguide formed thereon, and a cladding layer covering the core waveguide, wherein a certain amount of at least one dopant is added to both the core waveguide and the cladding layer so that the refractive index of the core waveguide is higher than that of the cladding layer. For fabricating the conventional optical waveguide, a silica glass substrate wafer is prepared, and a doped $SiO_2$ glass layer is deposited by electron-beam deposition, which doped $SiO_2$ glass layer is finally formed into a core waveguide. Next, a metal mask is formed on the doped $SiO_2$ glass layer by sputtering, and a photoresist layer is formed on the metal mask by photolithography. After that, a core waveguide is patterned on the substrate by reactive-ion etching. At this step, the substrate is treated at a high temperature of more than 1200° C. in order to stabilize the refractive index of the core waveguide. Next, a $SiO_2$ porous glass layer as a cladding layer is formed by flame deposition by hydrolyzing source gases, then heated and consolidated at more than 1200° C., and the cladding layer of transparent glass is obtained. Finally, the wafer is diced into a plurality of optical waveguides by a blade.

In the conventional optical waveguide and the conventional optical device using the same, however, there are disadvantages in that its connecting loss is likely to be extremely high, therefore the yield of fabrication thereof is low. Deformation of the substrate occurs by the high temperature treatment in the fabrication process, which causes a difference in the axes between the core waveguide and an optical fiber. Such deformations vary not only along the optical waveguide but also on the plane of the silica glass wafer where the optical waveguides are formed, and wafer by wafer.

Another disadvantage, is that the expected optical characteristics of optical devices, such as optical multiplexers/demultiplexer and wavelength-independent optical couplers are not obtained, because they depend on the lengths of the core waveguides. Furthermore, there is a disadvantage in that an absorption loss at a wavelength of 1.39 μm exists, which seems to be caused by the existence of hydroxyl groups.

SUMMARY OF THE INVENTION

Accordingly, it is an object of the invention to provide an optical waveguide, an optical module, and an optical system using the same to which an optical fiber can be connected precisely, so that alignment of the axes between the core waveguide and the optical fiber is realized.

It is a further object of the invention to provide an optical waveguide, an optical module, and an optical system using the same by which expected optical characteristics are obtained without special treatment, and absorption loss at a wavelength of 1.39 μm can be reduced.

It is a still further object of the invention to provide an optical waveguide, an optical module, and an optical system using the same which can be fabricated with high yield and low cost.

According to the first feature of the invention, an optical waveguide comprises: a substrate; and at least one core waveguide formed on the substrate for transmitting light therein; wherein the substrate is a pure $SiO_2$ synthetic silica glass substrate containing less than a predetermined concentration of hydroxyl groups.

According to the second feature of the invention, an optical module comprises: a substrate; at least one core waveguide formed on the substrate for transmitting light therein; at least one optical device for emitting light into the at least one core waveguide or receiving light from the at least one core waveguide, the at least one optical device being connected to one end of the at least one core waveguide; and at least one optical fiber connected to an opposite end of the one core waveguide; wherein the substrate is a pure $SiO_2$ synthetic silica glass substrate containing less than a predetermined concentration of hydroxyl groups.

According to the third feature of the invention, an optical system comprises: an optical emitting module comprising: a substrate; at least one core waveguide formed on the substrate for transmitting light therein; at least one optical device for emitting light into the at least one core waveguide, the at least one optical device being connected to one end of the at least one core waveguide; wherein the substrate is a pure $SiO_2$ synthetic silica glass substrate containing less than a predetermined concentration of hydroxyl groups; an optical receiving module comprising: a substrate; at least one core waveguide formed on the substrate for transmitting light therein; at least one optical device for emitting light into the at least one core waveguide or receiving light from the at least one core waveguide, the at least one optical device being connected to one end of the at least one core waveguide; wherein the substrate is a pure $SiO_2$ synthetic silica glass substrate containing less than a predetermined concentration of hydroxyl groups; an optical transmitter in which the optical emitting module is incorporated; an optical receiver in which the optical receiving module is incorporated; and an optical fiber for connecting the optical transmitter to the optical receiver.

BRIEF DESCRIPTION OF THE DRAWINGS

The invention will be explained in more detailed in conjunction with the appended drawings, wherein.

DESCRIPTION OF THE PREFERRED EMBODIMENTS

Before explaining an optical waveguide and optical device using the same in the first preferred embodiment, the aforementioned conventional connecting structures will be explained in FIGS. 1 and 2.

Figure 1:
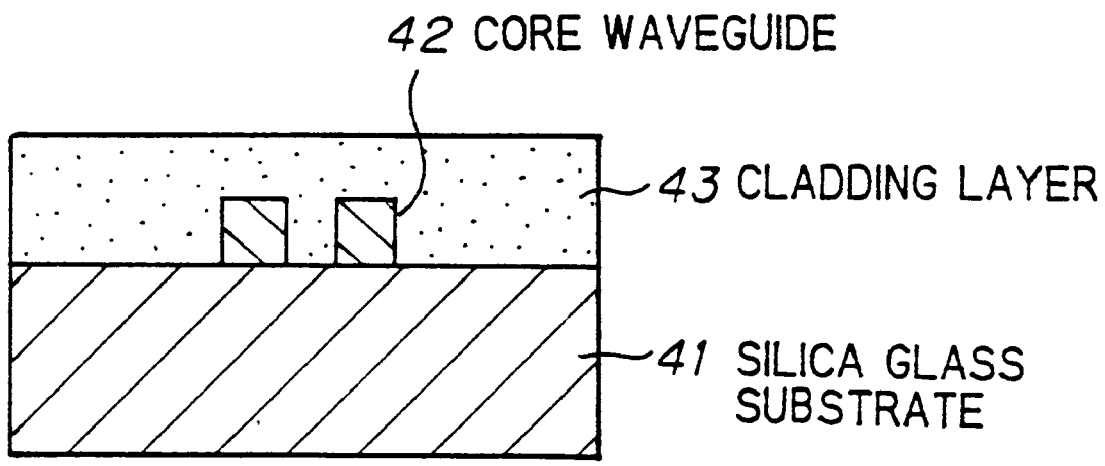
FIG. 1 is a cross-sectional view showing a conventional optical waveguide.

FIG. 1 shows a conventional optical waveguide, which comprises a silica glass substrate 41, at least one core waveguide 42 (two core waveguides are shown in FIG. 1) formed on the silica glass substrate 41, and a cladding layer 43 covering the core waveguide 42, wherein a certain amount of at least one dopant is added into both the core waveguide 42 and the cladding layer 43 so that the refractive index of the core waveguide 42 is higher than that of the cladding layer 43.

Figure 2:
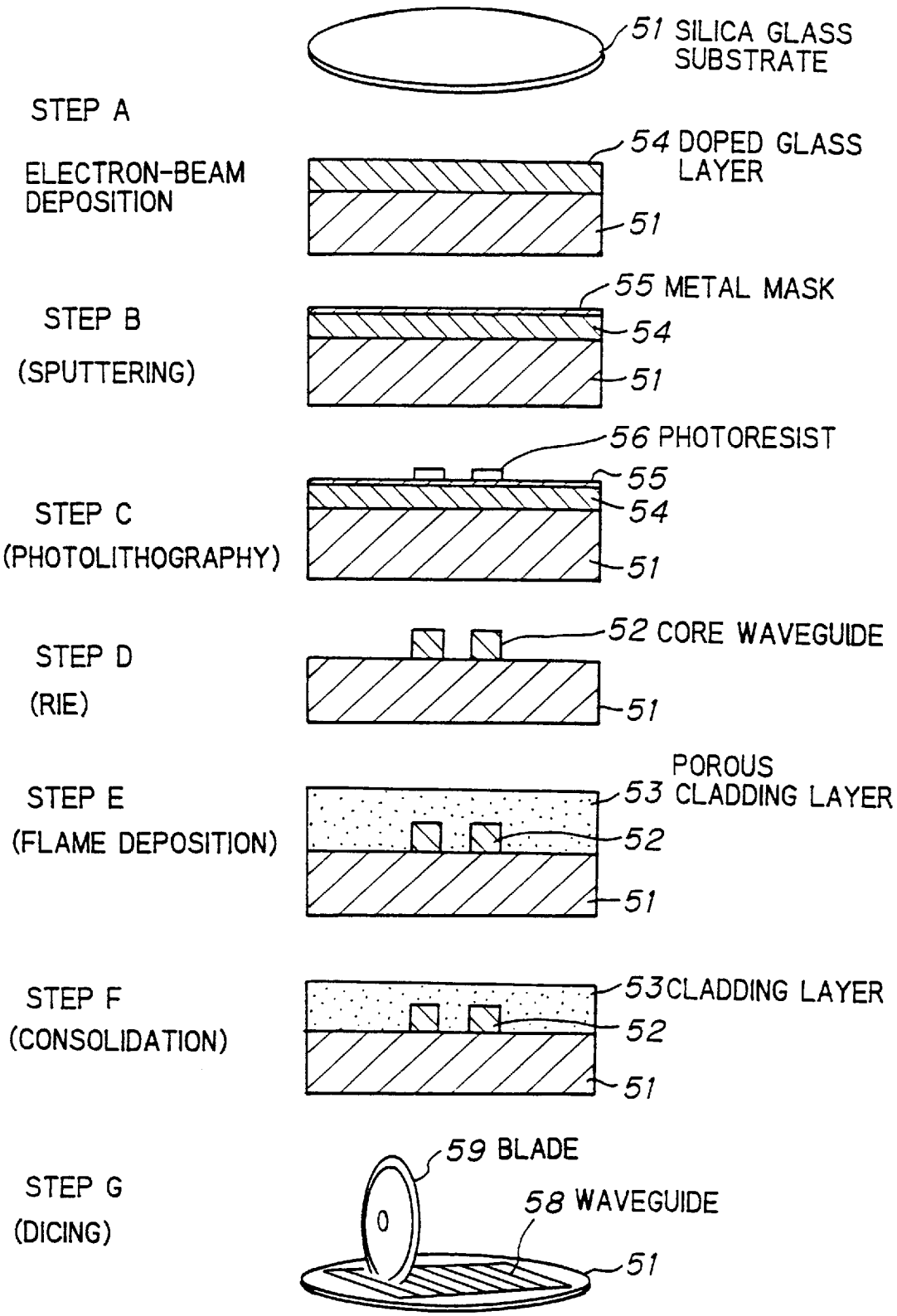
FIG. 2 is an explanatory view showing a method for manufacturing a conventional optical waveguide.

FIG. 2 shows the conventional method for fabricating the optical waveguide shown in FIG. 1. First, a silica glass substrate wafer 51 is prepared, and a doped $SiO_2$ glass layer 54 is deposited by electron-beam deposition, which layer 54 is finally formed into a core waveguide (STEP A). Next, a metal mask 55 is formed on the doped $SiO_2$ glass layer 54 by sputtering (STEP B), and a photoresist layer 56 is formed on the metal mask 55 by photolithography (STEP C). After that, a core waveguide 52 is patterned on the substrate 51 by means of a reactive-ion etching (STEP D). At this step, the substrate 51 is treated at a high temperature of more than 1200° C. in order to stabilize the refractive index of the core waveguide 52. Next, a $SiO_2$ porous glass layer 53 as a cladding layer is formed by flame deposition by hydrolyzing source gases (STEP E), then heated and consolidated at more than 1200° C., whereby the cladding layer 53 of transparent glass is obtained (STEP F). Finally, the wafer 51 is diced into a plurality of optical waveguides 58 by a blade 59 (STEP G).

A conventional 2-input×16-output waveguide-type optical star coupler (not shown) was fabricated by the method shown in FIG. 2. Optical fiber arrays (not shown), one ends of which were positioned in a V-shaped groove (not shown) formed on the surface of a block (not shown), were connected to the output ports of the optical star coupler. However, a certain number of output ports had extremely high connecting losses, and the fabrication yield was low. The cause thereof was investigated by the inventors, and it was found that deformation of the substrate occurs during the high temperature treatment in the fabrication process, which causes the difference in the axes between the core waveguide and the optical fiber. For example, such deformation includes the contraction of the pitches between each core waveguide, and large warps of the substrates make it almost impossible to mount on a package. As such deformations vary depending on not only the optical waveguide itself but also the plane of the silica glass wafer where the optical waveguides are formed and each wafer, it was difficult to eliminate these disadvantages by designing a optimum configuration of the waveguide including such contraction and warps which would occur.

The deformations discussed above also caused difficulty in obtaining expected optical characteristics of optical devices, in optical circuits such as optical multiplexer/demultiplexers and wavelength-independent optical couplers, because the optical characteristics of such circuits depend on the lengths of the core waveguides.

Furthermore, an absorption loss at a wavelength of 1.39 $\mu$m existed in the conventional optical waveguide and the conventional optical device using the same. This absorption loss seems to be caused by the existence of hydroxyl groups. The inventors considered it was caused by the condition of the core waveguide layer forming process, and studied the various forming conditions. However, the absorption losses could not be eliminated.

Figure 3:
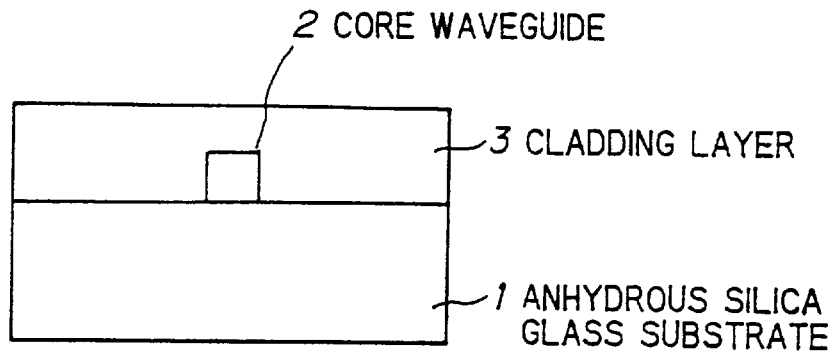
FIG. 3 is a cross-sectional view showing an optical waveguide in a first preferred embodiment according to the invention.

Next, referring to FIG. 3, a principle of an optical waveguide according to the invention will be explained. The optical waveguide comprises an anhydrous silica glass substrate 1, at least one core waveguide 2 in which a light travels, and a cladding layer 3 covering the core waveguide 2. The inventors have found that the lower the concentration of hydroxyl groups is, the higher the heat-resistant temperature is in a pure-$SiO_2$ synthetic silica glass substrate. If such pure $SiO_2$ synthetic silica glass substrate which contains less than a predetermined concentration of hydroxyl groups is used, contraction and warping of the waveguide become much lower. Therefore, optical fibers can be precisely connected to the core waveguides of the optical waveguide, and the expected optical characteristics are obtained as designed. Furthermore, the inventors has found that the optical absorption at 1.39 $\mu$m is caused by the existence of hydroxyl groups in the core waveguide which are diffused from the silica glass substrate. Therefore, if the silica glass substrate is substantially free from hydroxyl groups, the optical absorption can be reduced.

In the invention, the concentration of hydroxyl groups contained in a synthetic silica glass substrate of an optical waveguide or an optical device is essentially less than 300 ppm, preferably less than 100 ppm, more preferably less than 50 ppm.

For fabricating synthetic silica glasses, it is known that silicon tetrachloride is decomposed in a oxyhydrogen flame or plasma flame to deposit silica glass. Also, for reducing the amount of hydroxyl groups in synthetic silica glasses, dehydration by chlorine is known. However, both process yield residual chloride of 10 ppm ~1000 ppm in silica glasses. This residual chloride may make the heat resistant characteristics of the glass, i.e. the softening temperature of the glass, lower. Therefore, it is also important for the invention that a synthetic silica glass substrate is substantially free from chloride.

Furthermore, the synthetic silica glass substrate needs to have a deformation temperature (which is defined below) of 1000° C., preferably more than 1050° C. The deformation temperature is defined as a temperature where the coefficient of viscosity is $10^{14.5}$ P (poise), which is determined by setting and heating a wafer having a 6 inch diameter and 0.8 mm thickness in a furnace, placing a weight of 500 g (gram) thereon, and measuring the extension of the wafer at each temperature. The less the hydroxyl group concentration is, the higher the deformation temperature becomes, and less deformation of the substrate occurs.

In the invention, a pure $SiO_2$ synthetic glass substrate means a $SiO_2$ synthetic glass substrate which contains less than 10 ppm of heavy metal impurities like Fe, Cu, alkali metals like Na, K, etc. and alkali earth metals like Ca. These metal impurities may lower the deformation temperature or the softening temperature, and may affect the refractive index of the core waveguide by diffusion thereto. Therefore, the concentration of the metal impurities must be less than 10 ppm, preferably 1 ppm.

Next, an optical waveguide in the preferred embodiment according to the invention will be explained with reference to FIG. 3. The optical waveguide comprises an anhydrous synthetic silica glass substrate 1, which contains less than a predetermined concentration of hydroxyl groups, a core waveguide 2 having a rectangular cross-section being formed on the substrate 1, and a cladding layer 3 having a lower refractive index than the core waveguide 2 and which covers the cladding layer 3. For example, the core waveguide is 8 µm wide and 8 µm high, and made of $TiO_2$—$SiO_2$ glass, etc. The material as the cladding layer may be $B_2O_3$—$P_2O_5$—$SiO_2$ glass, for example, and the composition thereof is determined so that the refractive index difference between the core waveguide and the cladding layer is approximately 0.3%.

Conventional hydroxyl group containing synthetic silica glass wafers, the deformation of which occurs during high temperature treatment in their fabrication process, were prepared and their hydroxyl group concentrations were measured. As a result, each wafer had a hydroxyl group concentration of approximately 1000 ppm, and minimum values thereof in part of each wafer surface were more than 400 ppm.

The inventors considered that the concentration of hydroxyl groups in the wafer (substrate) is associated with the heat-resistant characteristics, and experimented on wafers having lower concentrations of hydroxyl groups. As a result, it has found that the lower the concentration of hydroxyl groups is, the less deformation of the wafer, i.e., contraction and warp, occurs during high temperature treatment in the fabrication process. Because the substrate becomes more difficult to soften at high temperature, that means an improvement in heat-resistance by decrease of hydroxyl group concentration.

Experiments were carried out as follows. Ten (10) wafers each of hydroxyl-containing synthetic silica glass wafers and anhydrous synthetic silica glass wafers were prepared and seven (7) devices of 2-input 16-output waveguide-type optical star couplers were produced from each wafer. In this case, the total width of the 16-output port was 5 mm. As a result, regarding contractions, the devices made from the hydroxyl-containing synthetic silica wafers had a mean contraction value of more than about 4.5 µm of the pitch from the designed value, and they varied depending on each wafer and the location within the wafer. By contrast, the devices made from the anhydrous synthetic silica wafers had a mean contraction value of less than 2 µm, even if the concentration of hydroxyl groups is between more than 200 ppm and less than 300 ppm. The contraction values were suppressed to less than 1 µm with a concentration of hydroxyl groups of 100 ppm, and to 0.5 µm with 50 ppm.

Regarding warps of the wafers, the devices made from the hydroxyl containing synthetic silica glass wafers not only had a mean value of 1 µm, but also ten percent of these devices had warps of more than 2 µm. Devices having such large warps are considered to be inappropriate for mounting on a package. By contrast, the devices made from the anhydrous synthetic silica glass wafers had a mean warp of less than 0.8 µm, even if the concentration of hydroxyl group is between more than 200 ppm and less than 300 ppm. The warps were reduced to less than 0.5 µm with a concentration of hydroxyl groups of 100 ppm, and to 0.2 µm with 50 ppm. As indicated above, in order to reduce a deformation of an optical waveguide or an optical device, the concentration of hydroxyl groups contained in the synthetic silica glass substrate of the optical waveguide or the optical device is essentially less than 300 ppm, preferably less than 100 ppm, more preferably less than 50 ppm.

Next, a Mach-Zehnder interferometer shown in FIG. 6, and a wavelength division multiplexer/demultiplexer (WDM) filter shown in FIG. 7 and made according to the invention will be demonstrated as follows.

Figure 6:
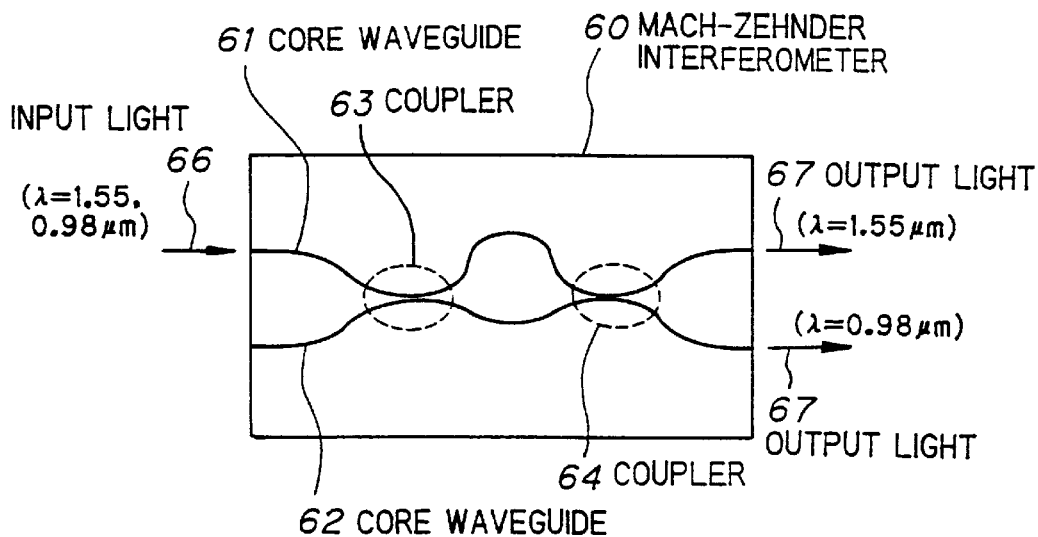
FIG. 6 is a planar view showing a Mach-Zehnder interferometer according to the invention.

FIG. 6 shows the Mach-Zehnder interferometer 60, which comprises a first core waveguide 61 and a second core waveguide 62, which are adjacent to each other at two spaced apart positions to form couplers 63, 64, wherein the lengths of the first core waveguide and the second core waveguide between the two couplers are designed to be different. The Mach-Zehnder interferometer is used for a long distance optical transmission system and an optical amplifier for a fiber sensing system, etc. In operation, for example, when it is used as an optical amplifier, a superposed input light 66, which includes an excitation light of 0.98 µm and a signal light of 1.55 µm and is output from an amplifying medium, is input into an input end of the first core waveguide 61, then the signal light of 1.55 µm, and the excitation light of 0.98 µm are divided and output from output ends of the first core waveguide and the second core waveguide as output lights 67, respectively. FIG. 7 shows the WDM filter, which comprises an input waveguide 71, a plurality of output waveguides 72 (8 output waveguides in FIG. 7) and arrayed waveguides 75 each having different lengths, both ends of which are connected to an output end of the input waveguide 71 and an input end of the output waveguide 72 by slab waveguides 73, 74, respectively. The WDM filter 70 may be used as a part of a light source section of an optical transmitter or a detecting section of a receiver in a wavelength-division multiplexing optical transmission system. In operation, input signal lights of λ1~λ8, which are input from the input waveguide 71, are divided into each signal light and output from each output waveguide 72. Otherwise, input signal lights of λ1~λ8, which are input from each output waveguide 72, respectively, are multiplexed and output from the input waveguide 71.

Figure 7:
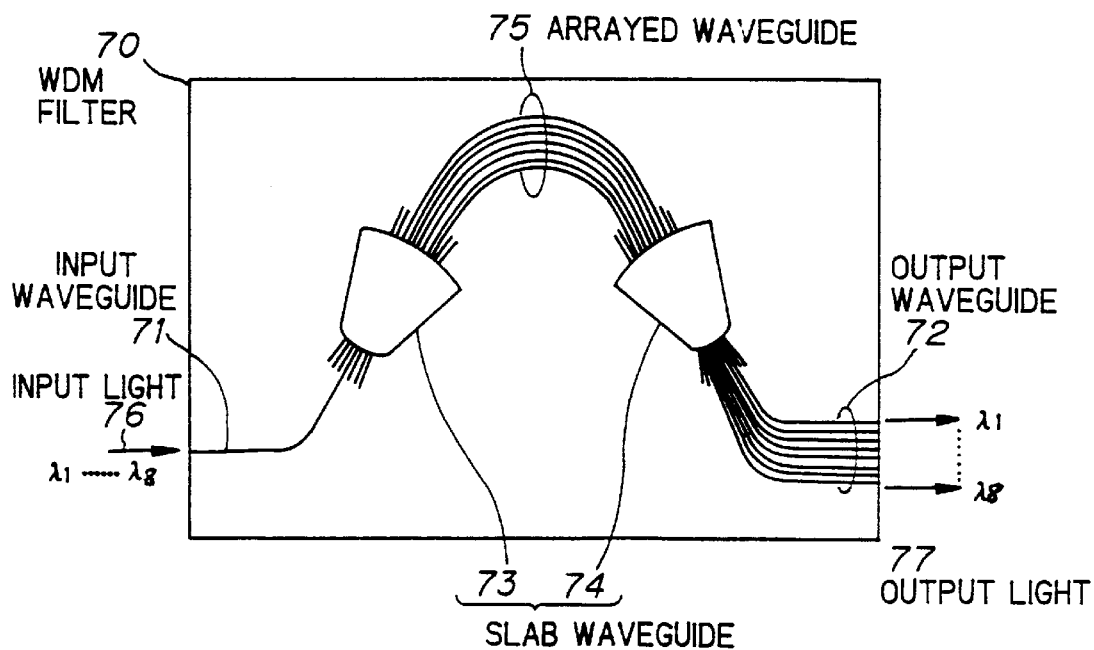
FIG. 7 is a planar view showing a WDM filter according to the invention.

Experiments were carried out with those Mach-Zehnder interferometers shown in FIG. 6 and WDM filters shown in FIG. 7, which were made from both hydroxyl-containing synthetic silica glass wafers (substrates) and anhydrous synthetic silica wafers (substrates). As a result, each device made from hydroxyl group containing synthetic silica glass wafers (substrates) contracted in its circuit size, and less than 30% of samples met the expected optical characteristics. By contrast, each device made from anhydrous synthetic silica glass wafers (substrates) did not contract as much, and 85% of samples having a hydroxyl group concentration of less than 300 ppm met the expected optical characteristics. Also, more than 95% of samples having less than 100 ppm hydroxyl group, and almost 100% having less than 50 ppm met the expected optical characteristics. Therefore, in order to improve the optical characteristics of an optical device, as mentioned before, the concentration of hydroxyl groups contained in a synthetic silica glass substrate of an optical device is essentially less than 300 ppm, preferably less than 100 ppm, more preferably less than 50 ppm.

For fabricating a synthetic silica glass substrate, if silicon tetrachloride is used as a source gas, or if the dehydration process is conducted in a chlorine-containing gas atmosphere, a certain amount of chlorine remains in the substrate or is absorbed into the substrate. Such residual chlorine may cause a reduction in softening temperature, i.e. deformation temperature. In the embodiment according to the invention, such source gasses that do not contain chlorine, such as methoxysilane, etc., are used for the deposition of synthetic silica glass, and the dehydration process is carried out in vacuum or inert gas atmosphere excluding chlorine, so that the substrate does not substantially contain chlorine.

Moreover, as described before, according to the invention, a pure $SiO_2$ synthetic glass substrate means a $SiO_2$ synthetic glass substrate which contains less than 10 ppm of metal impurities of heavy metals like Fe, Cu, alkali metals like Na, K, etc. and alkali earth metals like Ca. These metal impurities may lower the deformation temperature or the softening temperature, and may affect the refractive index of the core waveguide by diffusion. Therefore, in order to avoid such problems, high-purity source gases, in which metal impurities of less than 10 ppm, preferably 1 ppm, are contained, are used for the invention.

Figure 4:
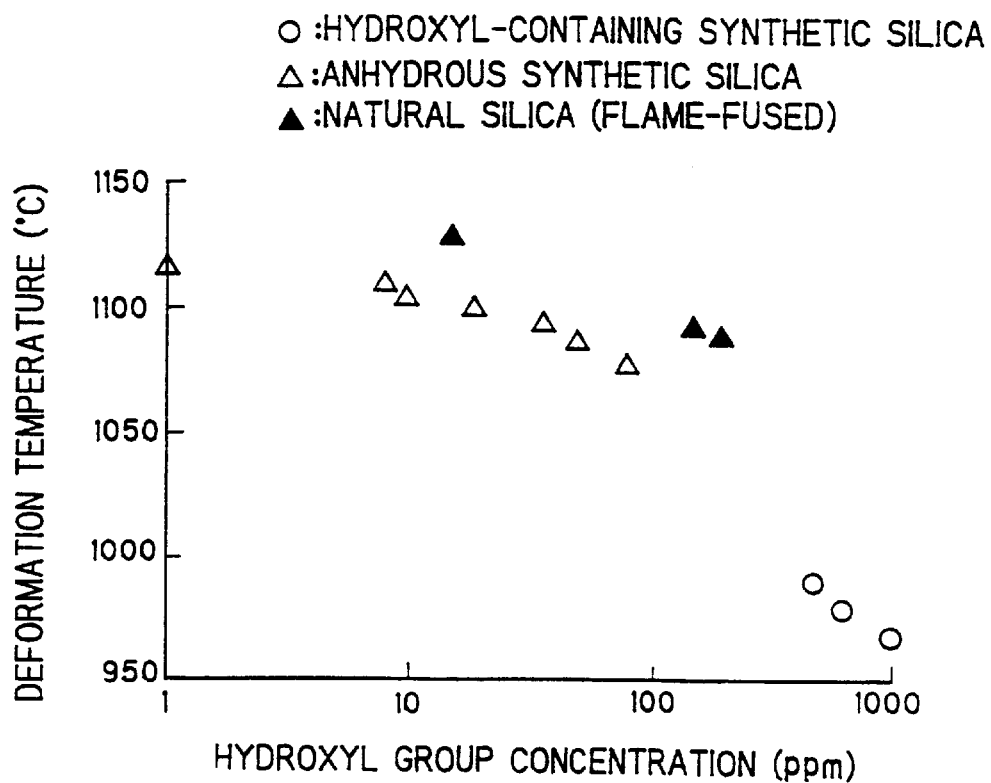
FIG. 4 is a graph showing dependence of deformation temperature on the concentration of hydroxyl groups for various silica glasses.

FIG. 4 shows the dependence of deformation temperature upon hydroxyl group concentration. As described before, the deformation temperature is defined as the temperature where the coefficient of viscosity is $10^{14.5}$ p (poise) which is determined by setting and heating a wafer having 6 inch diameter and 0.8 mm thickness in a furnace, placing a weight of 500 g (gram) thereon, and measuring the extension of the wafer at each temperature. The graph indicates that the conventional substrate of hydroxyl group containing synthetic silica, which contains hydroxyl groups of more than 400 ppm, has a deformation temperature of less than 1000° C. By contrast, the substrate of anhydrous synthetic silica, which contains hydroxyl groups of less than 100 ppm, has a deformation temperature of more than 1050° C. This result shows that the concentration of hydroxyl groups affects the deformation temperature, i.e. heat-resisting characteristics. Therefore, in order to reduce deformation of the substrate due to high temperature treatment in its fabrication process, the deformation temperature is to be greater than 1000° C., preferably 1050° C., more preferably 1100°C. (the concentration of hydroxyl groups being less than 10 ppm). The natural silica (flame-fused) glass substrate has higher deformation temperatures than that of anhydrous synthetic silica glass substrate. However, it contains metal impurities of more than several tens of ppm, which may deleteriously affect the optical characteristics of the optical device. For example, such impurities diffuse into a core waveguide on the substrate and vary the refractive index thereof. Therefore, this substrate is rather inappropriate for a silica glass substrate of the invention.

Figure 5A:
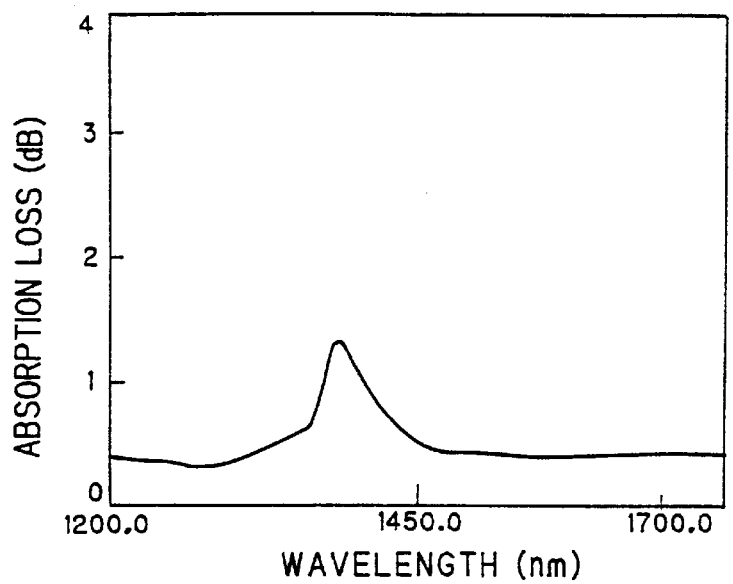
FIG. 5A and 5B are graphs showing variation of absorption loss as a function of wavelength for a conventional optical waveguide using a hydroxyl-containing synthetic silica glass substrate, and an optical waveguide using anhydrous synthetic silica glass substrate according to the invention, respectively.
Figure 5B:
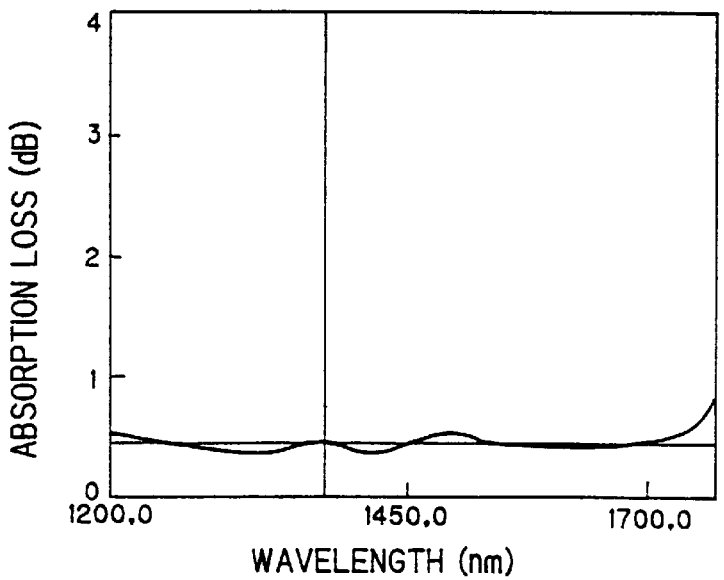

Next, in order to investigate the influence of hydroxyl groups on optical absorption at 1.39 μm in a core waveguide, some experiments were carried out by the inventors. Substrates of both hydroxyl group containing synthetic silica glass and anhydrous synthetic silica glass were prepared, and optical waveguides having a 8 μm×8 μm rectangular cross section, 6 cm long straight core waveguide were fabricated and the absorption loss characteristics as a function of wavelength were measured. In this case, the hydroxyl group containing synthetic silica glass substrate contains hydroxyl groups of 420 ppm, and the anhydrous synthetic silica glass substrate contains 50 ppm hydroxyl groups, respectively. The results are shown in FIGS. 5A and 5B. Although in the hydroxyl group-containing synthetic silica glass substrate, as shown in FIG. 5A, a peak absorption loss of more than 1 dB is observed at 1.39 μm wavelength, there is no peak in the anhydrous synthetic silica glass substrate, as shown in FIG. 5B. Therefore, in order to reduce the absorption loss at 1.39 μm in the core waveguide, it is necessary to decrease the concentration of hydroxyl groups in the substrate as well as to take conditions of the fabrication process of the core waveguide into consideration.

In the invention, each value of the concentration of hydroxyl groups was measured by an infrared spectroscopic analyzer (made by Nippon Bunko Sha).

In the invention, an optical module, which comprises an optical waveguide made from an anhydrous synthetic silica glass substrate as explained above, an optical element such as a light emitting element, light detector, connected to one end of a core waveguide, and an optical fiber connected to another end thereof, may be structured. In this case, any defect in the connection of the core waveguide to such elements due to deformation of the optical waveguide does not occur, so that improved productivity and low cost of the optical module are realized. Furthermore, optical systems such as optical transmitters and optical receivers with high reliability may be realized by using such an optical module.

Moreover, as explained before, an optical system, which comprises an optical fiber, an optical circuit device, such as an optical star coupler, optical multiplexers/demultiplexers, optical switches, optical modulators, wavelength-independent optical couplers, etc., and connected to the optical circuit device, the optical fiber being connected to both an input port and an output port of the optical circuit device, may be structured. As the optical circuit device has such improved optical characteristics, and the optical fibers may be connected to the optical circuit device so precisely, an optical system with high reliability may be realized.

As explained above, the invention provides the advantages set out below:

(1) an optical waveguide has little substrate deformation during its fabrication process. Therefore, the optical waveguide can be connected to an optical fiber without differences of axes, and expected optical characteristics can be realized.

(2) much less amounts of hydroxyl groups diffuse from the substrate into a core waveguide, so that optical absorption at 1.39 μm can be reduced.

(3) improved productivity and low cost of an optical module are realized. Therefore, optical systems such as optical transmitters and optical receivers with high reliability may be realized by using such optical module.

(4) an optical circuit device has improved optical characteristics, and optical fibers may be connected to the optical circuit device precisely, so that an optical system with high reliability may be realized.

Although the invention has been described with respect to a specific embodiment for complete and clear disclosure, the appended claims are not to be thus limited but are to be construed as embodying all modifications and alternative constructions that may occur to one skilled in the art and which fairly fall within the basic teaching herein set forth.

What is claimed is:

1. An optical waveguide comprising:

a substrate (1); and at least one core waveguide (2) formed on said substrate for transmitting light therein; wherein said substrate is a pure $SiO_2$ synthetic silica glass substrate;

a cladding layer covering the core and lining the substrate;

said substrate having a deformation temperature at which its viscosity is $10^{14.5}$ poise, of more than 1000° C.

2. An optical waveguide according to claim 1, wherein:

said pure $SiO_2$ synthetic silica glass substrate contains less than a predetermined concentration of hydroxyl groups.

3. An optical waveguide according to claim 2, wherein:

the concentration of said hydroxyl groups is less than 300 ppm.

4. An optical waveguide according to claim 2, wherein:

the concentration of said hydroxyl groups is less than 100 ppm.

5. An optical waveguide according to claim 2, wherein:

the concentration of said hydroxyl groups is less than 50 ppm.

6. An optical waveguide according to claim 1, wherein:

said pure $SiO_2$ synthetic silica glass substrate does not substantially contain chlorine.

7. An optical waveguide according to claim 1, wherein:

said optical waveguide comprises an optical device including at least one of an optical star coupler, an optical multiplexer/demultiplexer, an optical switch, an optical modulator, a wavelength-independent optical coupler, and an optical transmission module.

8. An optical waveguide according to claim 1, wherein said substrate comprises a flat planar surface, and said at least one core waveguide is formed on a portion of said flat planar surface.

9. An optical waveguide according to claim 7, wherein said substrate comprises a flat planar surface, and said at least one core waveguide is formed on a portion of said flat planar surface.

10. An optical module comprising:

a planar substrate;

at least one core waveguide formed on said substrate for transmitting light therein; at least one optical device for emitting light into said at least one core waveguide or receiving light from said at least one core waveguide, said at least one optical device being connected to one end of said at least one core waveguide; a cladding layer covering the core and lining the substrate; and at least one optical fiber connected to an opposite end of said at least one core waveguide; wherein said substrate is a pure $SiO_2$ synthetic silica glass substrate having a deformation temperature at which its viscosity is $10^{14.5}$ poise, of more than 1000° C.

11. An optical module according to claim 10, wherein said substrate comprises a flat planar surface, and said at least one core waveguide is formed on a portion of said flat planar surface.

12. An optical system comprising:

an optical emitting module comprising: a planar substrate; at least one core waveguide formed on said substrate for transmitting light therein; at least one optical device for emitting light into said at least one core waveguide, said at least one optical device being connected to one end of said at least one core waveguide; a cladding layer covering the core and lining the substrate; wherein said substrate is a pure $SiO_2$ synthetic silica glass substrate having a deformation temperature at which its viscosity is $10^{14.5}$ poise, of more than 1000° C.;

an optical receiving module comprising: a substrate; at least one core waveguide formed on said substrate for transmitting light therein; at least one optical device for emitting light into said at least one core waveguide, said at least one optical device being connected to one end of said at least one core waveguide; wherein said substrate is a pure $SiO_2$ synthetic silica glass substrate having a deformation temperature at which its viscosity is $10^{14.5}$ poise, of more than 1000° C.;

an optical transmitter in which said optical emitting module is incorporated;

an optical receiver in which said optical receiving module is incorporated; and an optical fiber for connecting said optical transmitter to said optical receiver.

13. An optical system according to claim 12, wherein each of said substrates comprises a flat planar surface, and said at least one core waveguide is formed on a portion of said flat planar surface.

* * * * *